(12) United States Patent  
Fukui

(10) Patent No.: US 7,920,874 B2  
(45) Date of Patent: Apr. 5, 2011

(54) POSITION ESTIMATING SYSTEM

(75) Inventor: Kiyoshi Fukui, Mie (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 718 days.

(21) Appl. No.: 11/513,256

(22) Filed: Aug. 31, 2006

(65) Prior Publication Data

US 2007/0060170 A1    Mar. 15, 2007

(30) Foreign Application Priority Data

Sep. 9, 2005   (JP) ................................ 2005-261766

(51) Int. Cl.  
*H04W 24/00*   (2009.01)

(52) U.S. Cl. ............... 455/456.1; 455/456.2; 455/456.3; 455/456.5; 455/456.6; 455/457; 342/450

(58) Field of Classification Search ............... 455/456.6, 455/456.1, 456.5; 342/45, 457, 357, 450–456  
See application file for complete search history.

(56) References Cited

U.S. PATENT DOCUMENTS

| | | | |
|---|---|---|---|
| 6,362,783 B1* | 3/2002 | Sugiura et al. ................ | 342/457 |
| 2002/0183071 A1* | 12/2002 | Shioda et al. ................ | 455/456 |
| 2003/0008669 A1* | 1/2003 | Stein et al. .................... | 455/456 |
| 2003/0222819 A1* | 12/2003 | Karr et al. .................... | 342/457 |
| 2005/0227703 A1* | 10/2005 | Cheng ........................ | 455/456.1 |
| 2007/0037518 A1* | 2/2007 | Ninomiya et al. ........... | 455/41.2 |

FOREIGN PATENT DOCUMENTS

| | | |
|---|---|---|
| JP | 05-011039 A | 1/1993 |
| JP | 05-264710 A | 10/1993 |
| JP | 09-159746 | 6/1997 |
| JP | 2000-075012 A | 3/2000 |
| JP | 2005-507070 | 3/2005 |

OTHER PUBLICATIONS

"A Maximum Likelihood Estimation Method of Localization using RSSI in wireless Sensor Networks" by Dapeng Zhao and seven others, Electronic Information Communication Society, technical report, IN 2004-327, pp. 409-4014.

* cited by examiner

*Primary Examiner* — Kamran Afshar  
*Assistant Examiner* — Lameka J Kirk  
(74) *Attorney, Agent, or Firm* — Rabin & Berdo, PC

(57) ABSTRACT

A position estimating system capable of accurately estimating the position assumed by a target terminal user based upon measurement of wireless reception signal levels of signals from a target terminal is provided. The position estimating system includes a target terminal that wirelessly transmits a position estimation request, a plurality of reference terminals disposed at specific positions which, measure the signal strength of wireless signals from the target terminal and a position estimating server that estimates the position of the target terminal based upon the reception signal levels measured in correspondence to each of the reference terminals. The reference terminals each include a reception signal level utilization OK/NG judgment unit that makes a judgment as to whether or not the reception signal level value having been measured is to be used in position estimation based upon an index indicating the level of reliability of the reception signal.

4 Claims, 4 Drawing Sheets

POSITION ESTIMATING SYSTEM

CROSS REFERENCE TO RELATED APPLICATION

The disclosure of Japanese Patent Application No. JP2005-261766 filed Sep. 9, 2005, entitled "Position Estimating System". The contents of that application are incorporated herein by reference in their entirety.

BACKGROUND OF THE INVENTION

The present invention relates to a position estimating system that estimates the position of a terminal based upon the signal strength of a received wireless signal.

DESCRIPTION OF THE RELATED ART

A position estimating system in the related art estimates the position of a target terminal through trigonometry by measuring at least three wireless terminals located at known positions the level of a signal received from a target terminal the position of which is to be estimated and individually estimating the distances to the target terminal from the reference terminals based upon the reception signal strengths thus measured (see, for instance, patent reference literature 1).

However, a phenomenon referred to as multipath fading, whereby the reception signal strength fluctuates even if the positional relationship between the transmitting terminal and the receiving terminal remains unchanged, occurs in a wireless transmission path due to reflection, diffraction or the like. It is known that the accuracy of position estimation is compromised when multipath fading manifests.

Accordingly, various measures are taken to improve the accuracy of the position estimation in the position estimating system in the related art. For instance, a stochastic model indicating the relationship of the distance between terminals to the reception signal strength is created by taking into consideration multipath fading occurring in the wireless transmission path as a crucial factor and the number of reference terminals is increased or the reception signal strength at a given reference terminal is measured a plurality of times (see, for instance, patent reference literature 2 and nonpatent reference literature 1).

In addition, the position of a target terminal is estimated in some position estimating systems in the related art by assuming that there are a plurality of target terminals and thus using the reception signal strength of signals exchanged between target terminals as well as the reception signal strength of signals received at the reference terminals (see nonpatent reference literature 1).

(patent reference literature 1) Japanese Laid Open Patent Publication No. H9-159746 (pages 3~4 and FIG. 1)

(patent reference literature 2) Japanese Examined Patent Publication No. 2005-50 7070 (pages 12~27 and FIGS. 1 through 9)

(nonpatent reference literature 1) "A Maximum Likelihood Estimation Method of Localization using RSSI in wireless Sensor Networks" by Dapeng ZHAO and seven others, Electronic Information Communication Society, technical report, IN 2004-327, pp. 409-4014

In the systems achieved in the related art described above, wireless communication is executed in open space. For this reason, wireless signals transmitted simultaneously from two terminals cannot be distinguished from each other and if another terminal transmits a wireless signal while wireless communication between a given pair of terminals is in progress, the signal from the other transmitting terminal is added as an interference signal onto the signal from the terminal being polled by the receiving terminal. The interference signal added onto the signal from the polled terminal increases the strength of the received signal. There may also be an interference signal attributable to an electromagnetic wave or the like leaking from an electronic device. Inclusion of such interference in the received signal leads to a fluctuation of the relationship of the level of the received signal to the distance between the terminals which, in turn, reduces the accuracy of the position estimation executed based upon the level of a received signal.

SUMMARY OF THE INVENTION

The position estimating system according to the present invention comprises a target terminal that wirelessly transmits a position estimation request, a plurality of reference terminals disposed at specific positions to measure values indicating levels of wireless signals from the target terminal and a position estimating server that estimates the position of the target terminal based upon the reception signal levels measured in correspondence to each of the reference terminals. The reference terminals each include a reception signal level utilization OK/NG judgment unit that makes a judgment as to whether or not the reception signal level value having been measured is to be used in position estimation based upon an index indicating the level of reliability of the wireless signal.

According to the present invention, the values indicating the wireless signal levels from the target terminal are individually measured at a plurality of reference terminals and a judgment is made at each of the plurality of reference terminals as to whether or not the signal level having been measured is to be used in the position estimation based upon the index indicating the level of reliability of the wireless signal. Thus, the position of the target terminal can be estimated with a high level of accuracy.

DETAILED DESCRIPTION OF THE PREFERRED EMBODIMENTS

Embodiment 1

Figure 1:
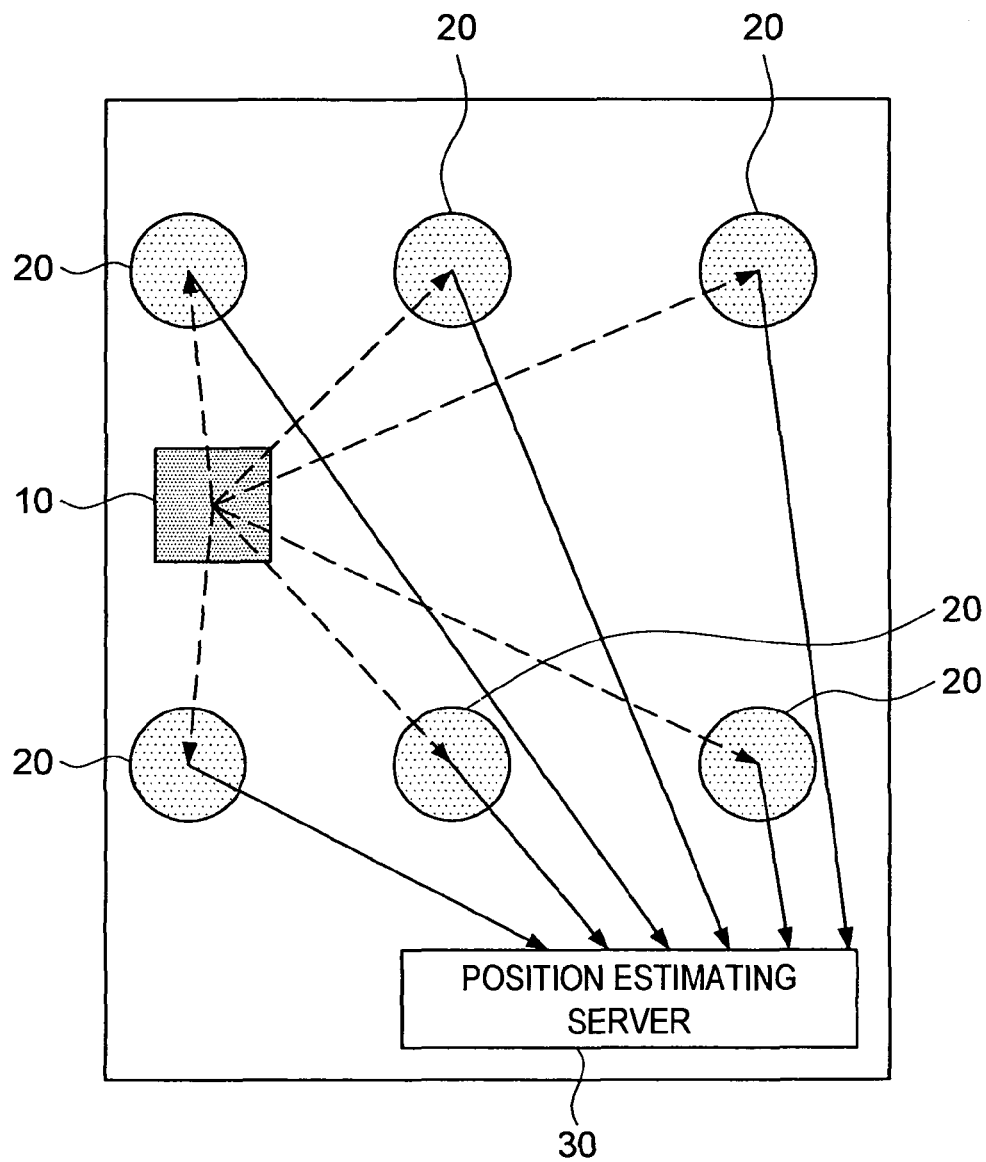
FIG. 1 is a schematic diagram showing the structure adopted in the position estimating system in embodiment 1 of the present invention.
Figure 2:
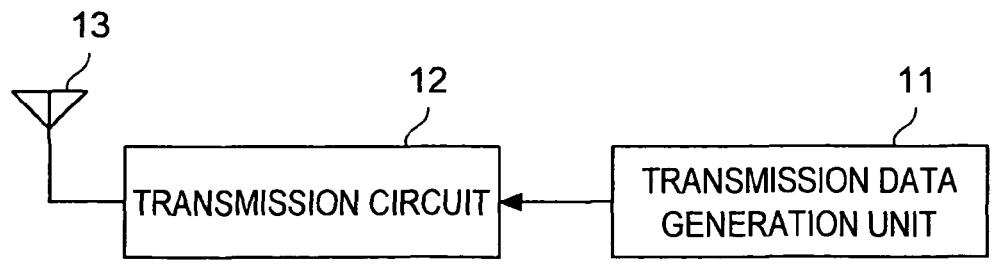
FIG. 2 shows the structure adopted in the target terminal in embodiment 1.
Figure 3:
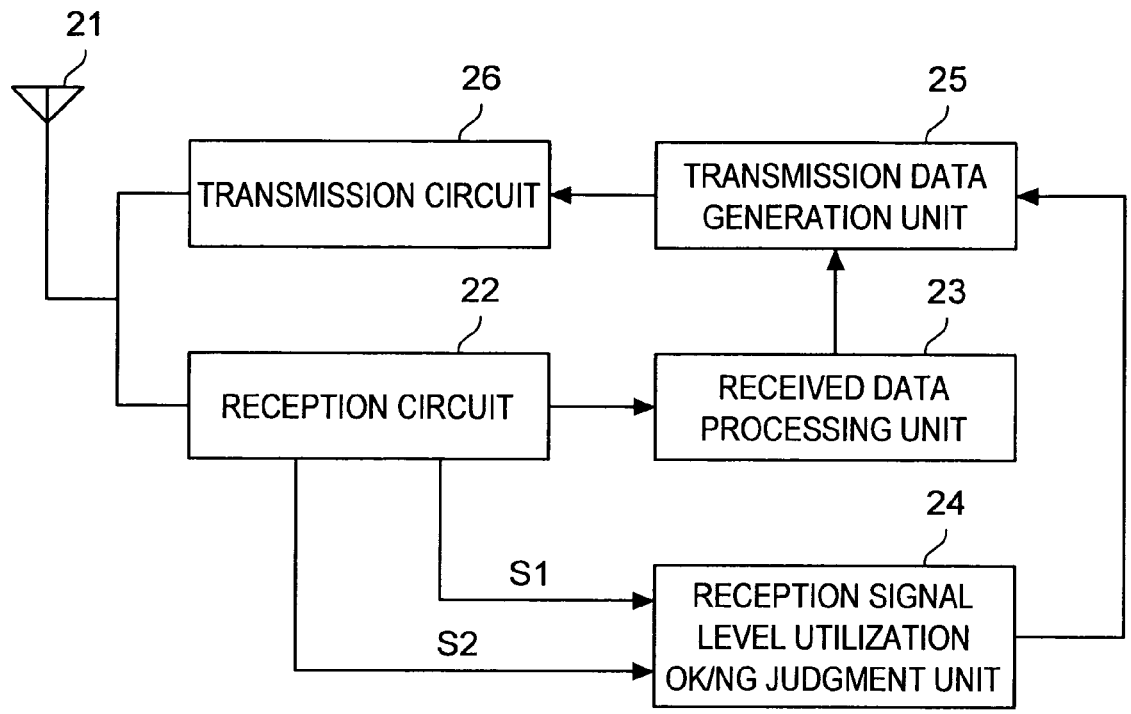
FIG. 3 shows the structure adopted in the reference terminals in embodiment 1.
Figure 4:
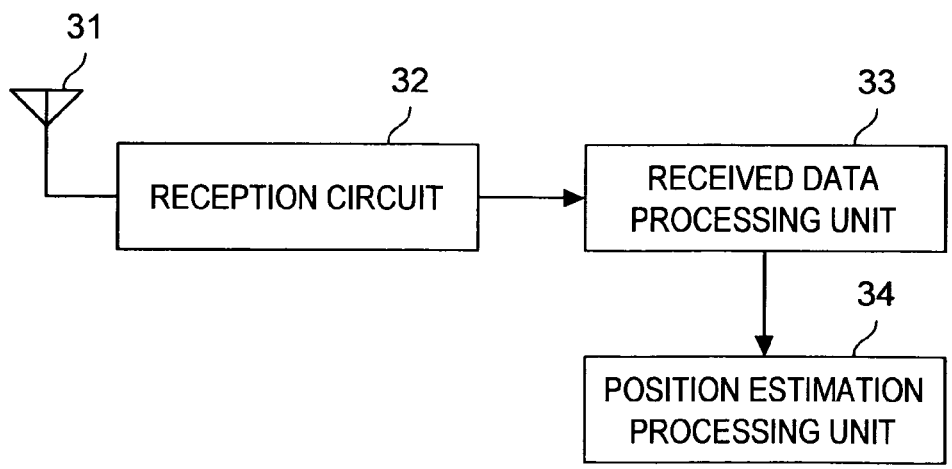
FIG. 4 shows the structure adopted in the position estimating server in embodiment 1.

FIG. 1 is a schematic diagram showing the structure adopted in the position estimating system in embodiment 1 of the present invention, FIG. 2 shows the structure adopted in the target terminal in embodiment 1, FIG. 3 shows the structure adopted in the reference terminals in embodiment 1 and FIG. 4 shows the structure adopted in the position estimating server in embodiment 1.

The position estimating system achieved in embodiment 1 comprises a target terminal 10 carried by a user, a plurality of reference terminals 20 installed indoors in advance, e.g., inside buildings and a position estimating server 30 that estimates the position of the target terminal 10 based upon measured values indicating signal strength levels, which are transferred from the individual reference terminals 20, as shown in FIG. 1.

As shown in FIG. 2, the target terminal 10 comprises a transmission data generation unit 11, a transmission circuit 12 and an antenna 13 from which a wireless signal is transmitted. The transmission data generation unit 11 generates position estimation request data with timing with which the position needs to be estimated, e.g., when a switch (not shown) mounted at the main unit is turned on or over predetermined time intervals having been automatically set and outputs the position estimation request data to the transmission circuit 12. The position estimation request data include an ID code attached thereto so as to enable identification of the target terminal. The transmission circuit 12 converts the position estimation request data having been generated at the transmission data generation unit 11 to a position estimation request signal and transmits the request signal resulting from the conversion as a wireless signal into space through the antenna 13.

As shown in FIG. 3, the reference terminals 20 each comprise an antenna 21 via which wireless signals are transmitted/received, a reception circuit 22, a reception data processing unit 23, reception signal level utilization OK/NG judgment unit 24, a transmission data generation unit 25 and a transmission circuit 26. The reception circuit 22 processes a wireless signal received via the antenna 21 so as to convert the wireless signal to digital information and then outputs the digital information to the reception data processing unit 23 as received data. In addition, the reception circuit 22 measures a reception signal strength value S1 of the wireless signal and a reliability level S2 of the wireless signal when converting the wireless signal to digital information and outputs the measurement results to the reception signal level utilization OK/NG judgment unit 24.

The wireless signal reliability level S2 is used as an index indicating the accuracy with which the wireless signal value, i.e., an analog value, is converted to a specific digital signal value, i.e., a discrete value. For instance, in spread spectrum communication, a symbol representing digital information is first multiplied by a bit string referred to as a PN series before transmission, and the digital signal is restored on the receiving side by assuming a correlation with the PN series having been multiplied on the transmitting side. If received signal has not been degraded by noise or an interference signal, the value indicating the correlation between the received signal and the PN series is high, and in this case, the symbol representing the digital information having been transmitted can be restored with a high level of reliability. If, on the other hand, the received signal has been degraded to a significant extent due to noise or interference, the correlational value indicating the correlation between the received signal and the PN series is low, in which case, the likelihood of erroneous restoration of the symbol representing the digital information is high. In other words, if the correlational value is low, the received signal has been affected by noise or interference to a greater extent.

The reception data processing unit 23 mentioned earlier processes the reception data provided by the reception circuit 22, and if the received data constitute a position estimation request transmitted from the target terminal 10, it issues an instruction for the transmission data generation unit 25 to generate transmission data indicating the reception signal level value S1 having been measured. The reception signal level utilization OK/NG judgment unit 24 receives the reception signal level value S1 and the reliability level S2 from the reception circuit 22 and transfers the reception signal level value S1 and the results of judgment to the transmission data generation unit 25. The judgment results are obtained by comparing the reliability level S2 with a predetermined threshold value. If the reliability level S2 is higher than the threshold value, a utilization OK decision is made, whereas if the reliability level S2 is lower than the threshold value, a utilization NG decision is made. It is to be noted that the threshold value used in this judgment may be a constant value that remains unchanged at all times, or it may be adjusted to a specific value in correspondence to a given reception signal strength value range.

The transmission data generation unit 25 generates transmission data to be transmitted to the position estimating server 30, which indicate the reception signal level value S1 having been received from the reception signal level utilization OK/NG judgment unit 24. The transmission data are generated only if an instruction for transmission data generation, issued by the reception data processing unit 23, is received and the judgment results provided by the reception signal level utilization OK/NG judgment unit 24 indicate an OK decision. In addition, the transmission data generation unit 25 attaches an ID code set in advance to be used to identify the subject reference terminal and an ID code corresponding to the target terminal 10 having issued the position estimation request to the transmission data it generates. The transmission circuit 26 converts the transmission data generated at the transmission data generation unit 25 to a wireless signal and outputs the wireless signal to the antenna 21.

As shown in FIG. 4, the position estimating server 30 comprises an antenna 31 through which wireless signals are received, a reception circuit 32, a received data processing unit 33 and a position estimation processing unit 34. The reception circuit 32 processes a wireless signal input via the antenna 31 so as to convert the wireless signal to digital information and transfers the digital information to the received data processing unit 33 as received data. The received data processing unit 33 processes the received data and if the received data indicate the reception signal level value S1 having been transmitted from a reference terminal 20, it transfers the received data to the position estimation processing unit 34.

The position estimation processing unit 34 holds therein position data indicating the correspondence between the ID codes of the plurality of reference terminals 20 installed indoors and the reference terminals 20 installation position (e.g., coordinates) and distance data indicating the correspondence between the reception signal level value and the distances between the transmitting terminal and receiving terminal. By referencing the distance data based upon the reception signal level value S1 from a reference terminal 20, which has been transferred from the received data processing unit 33, it determines the distance between the target terminal 10 and the reference terminal 20. It also determines the installation position of the reference terminal 20 by referencing the position data based upon the ID code of the reference terminal 20. Then, based upon the distances between terminals and the installation positions of the reference terminals 20 individually determined as described above, it estimates the position of the target terminal 10.

As in the method disclosed in nonpatent reference literature 1 mentioned earlier, the relationship between the reception signal level value and the distance between the terminals is determined by taking into consideration the possible occurrence of multipath fading in the wireless transmission path. It is to be noted that the position estimation method to be adopted in conjunction with the present invention is not limited to that disclosed in nonpatent reference literature 1 and another method may be adopted as long as the position of the target terminal 10 is estimated based upon the reception signal level value S1 by using a relationship of the reception signal strength and the distance between the target terminal 10 and the reference terminal 20.

Next, the operation of the position estimating system adopting the structure described above is explained.

A wireless position estimation request signal from the target terminal 10 is received at the plurality of reference terminals 20 installed at positions at which the position estimation request signal can be received. At this time, at each reference terminal 20 having received the position estimation request signal, the reception circuit 22 measures the reception signal level value S1 and the reliability level S2 corresponding to the position estimation request signal, outputs the reception signal level value S1 and the reliability level S2 to the reception signal level utilization OK/NG judgment unit 24, converts the position estimation request signal to digital information and outputs the digital information to the reception data processing unit 23 as received data.

Next, as the received data processing unit 23 recognizes a position estimation request in the received data, the received data processing unit 23 issues an instruction for the transmission data generation unit 25 to generate transmission data indicating the reception signal level value. The reception signal level utilization OK/NG judgment unit 24, in turn, compares the reliability level S2 with a threshold value set in advance and makes a utilization NG decision if the reliability level S2 is lower than the threshold value. If, on the other hand, the reliability level S2 is higher than the threshold value, it makes a utilization OK decision and outputs the judgment results and the reception signal level value S1 to the transmission data generation unit 25.

Subsequently, as the transmission data generation unit 25 receives the reception level utilization OK decision and the corresponding reception signal level value S1 from the reception signal level utilization OK/NG judgment unit 24 together with the transmission data generation instruction, it generates transmission data indicating the reception signal level value S1. The transmission circuit 26 then converts the transmission data to a wireless signal and transmits the wireless signal to the position estimating server 30 via the antenna 21.

The position estimating server 30, having received the wireless signal indicating the reception signal level value S1 with the high level of reliability transmitted from the reference terminal 20, determines the distance between the terminals by referencing the distance data based upon the reception signal level value S1 and also determines the installation position of the reference terminal 20 by referencing the position data based upon the ID code assigned to the reference terminal 20. The distance and the installation position are determined each time a wireless signal (reception signal level value S1) is received from a reference terminal 20. Then, based upon the distances between target terminal and the reference terminals and the installation positions of the individual reference terminals 20 thus determined, the position of the target terminal 10 is estimated.

In embodiment 1 described above, a decision is made at each reference terminal 20 as to whether or not the reception signal level value S1 can be used based upon the reliability level S2. Thus, the position of the target terminal can be estimated without using any data with a low reliability level S2 indicating that the corresponding reception signal level value S1 may contain interference and the accuracy of the position estimation is improved. In addition, since the reception signal level value S1 with a low reliability level S2 is not transmitted to the position estimating server 30, the volume of data exchanged for purposes of position estimation is minimized so as to reduce the length of time required for the processing.

Embodiment 2

Figure 5:
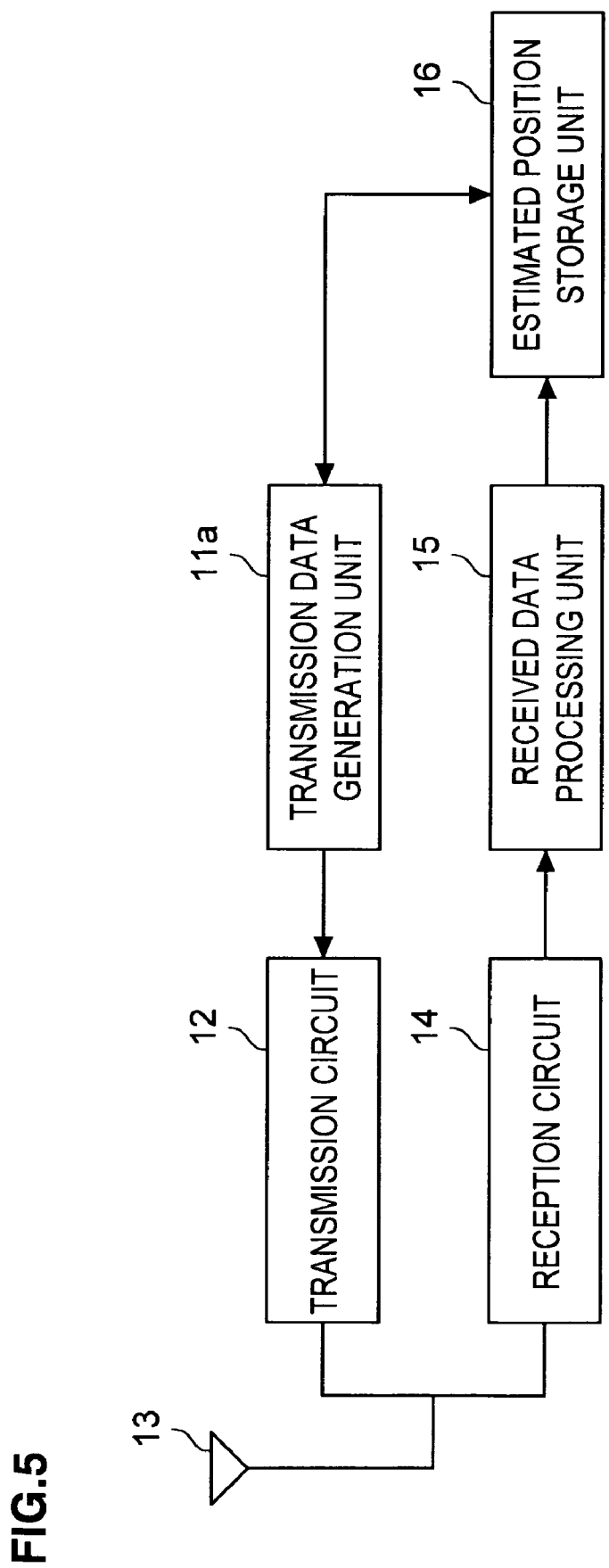
FIG. 5 shows the structure adopted in the target terminal in embodiment 2.
Figure 6:
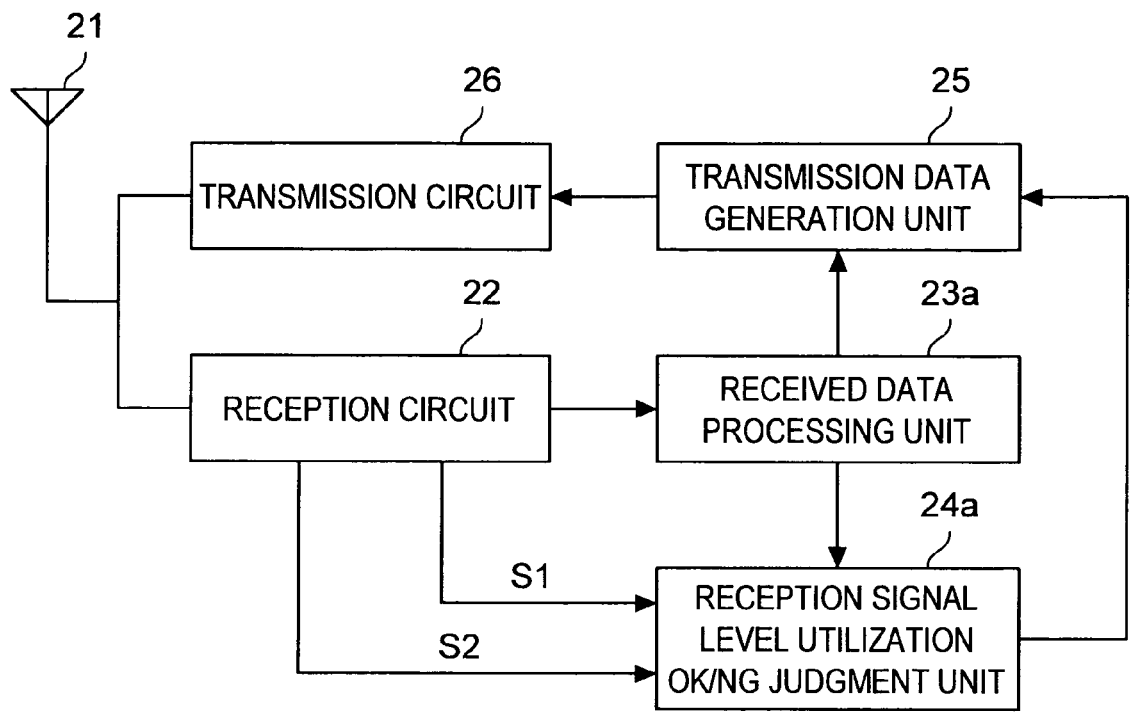
FIG. 6 shows the structure adopted in the reference terminals in embodiment 2.
Figure 7:
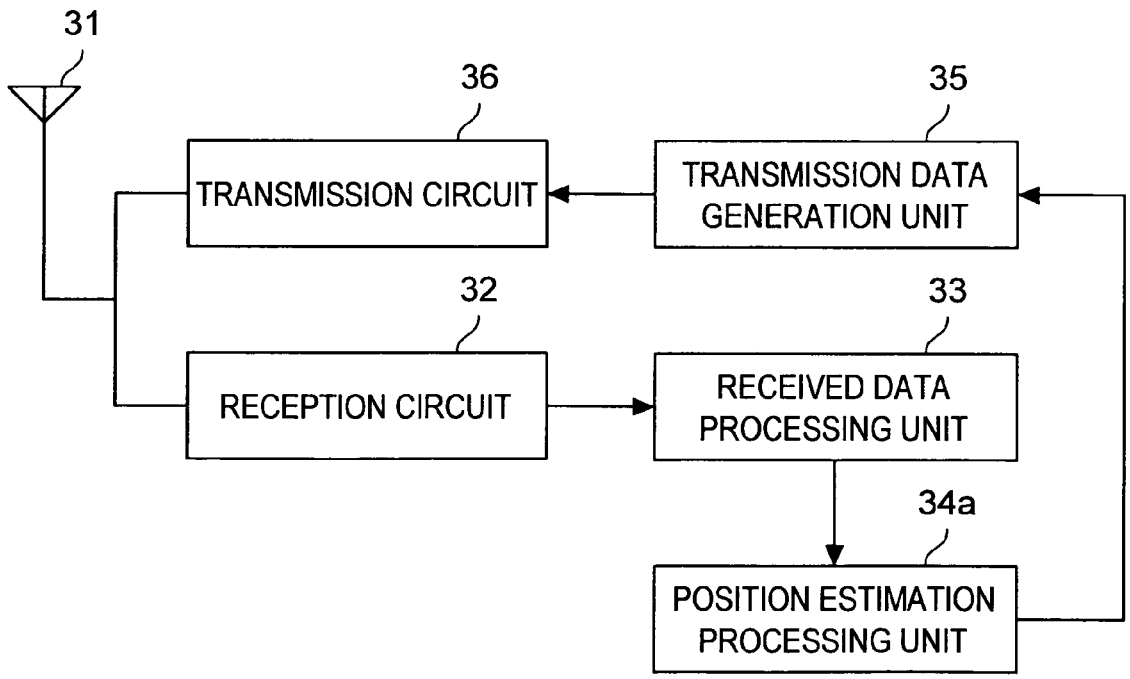
FIG. 7 shows the structure adopted in the position estimating server in embodiment 2.

FIG. 5 shows the structure adopted in the target terminal in embodiment 2, FIG. 6 shows the structure adopted in the reference terminals in embodiment 2 and FIG. 7 shows the structure adopted in the position estimating server in embodiment 2. It is to be noted that the same reference numerals are assigned to components identical to or equivalent to those in embodiment 1 explained in reference to FIGS. 2 through 4 to preclude the necessity for a repeated explanation thereof. In addition, the position estimating system in embodiment 2 adopts a structure identical to that shown in FIG. 1 having been explained in reference to embodiment 1.

The target terminal 10 in embodiment 2 includes an antenna 13, a transmission circuit 12, a reception circuit 14, a reception data processing unit 15, an estimated position storage unit 16 and a transmission data generation unit 11a, as shown in FIG. 5. The reception circuit 14 processes a wireless signal transmitted from the position estimating server 30 so as to convert the wireless signal to digital information and outputs the digital information to the received data processing unit 15 as received data. The received data processing unit 15 processes the received data and if the received data contain previously estimated position information, it stores the previously estimated position information into the estimated position storage unit 16. This estimated position information indicates the position of the subject target terminal determined in response to a previously transmitted position estimation request signal.

Upon detecting, for instance, an operation of a switch (not shown) the transmission data generation unit 11a reads out the previously estimated position information from the estimated position storage unit 16, generates position estimation request data containing the information thus read and outputs the generated position estimation request data to the transmission circuit 12. If, on the other hand, estimated position information is not stored in the estimated position storage unit 16, the transmission data generation unit 11a generates position estimation request data containing data that indicate that no estimated position information is stored and outputs the position estimation request data thus generated to the transmission circuit 12.

The reference terminals 20 each comprise an antenna 21, a reception circuit 22, a received data processing unit 23a, a reception signal level utilization OK/NG judgment unit 24a, a transmission data generation unit 25 and a transmission circuit 26, as shown in FIG. 6. In addition to executing the operation executed in embodiment 1, the received data processing unit 23a outputs to the reception signal level utilization OK/NG judgment unit 24a the previously estimated position information included in the received data. The reception signal level utilization OK/NG judgment unit 24a holds therein threshold value data indicating threshold values each made to correspond to a specific distance. If there is no previously estimated position information, the reception signal level utilization OK/NG judgment unit 24a engages in operation identical to that executed in embodiment 1, whereas if estimated position information is received, it calculates the distance to the target terminal 10 based upon the estimated position information and the preset subject reference terminal position information and selects the threshold value corresponding to the calculated distance from the threshold value data. This threshold value is used when judging whether or not the reception signal level value S1 can be used as has been explained in reference to embodiment 1.

As shown in FIG. 7, the position estimating server 30 comprises an antenna 31, a reception circuit 32, a received data processing unit 33, a position estimation processing unit 34a, a transmission data generation unit 35 and a transmission circuit 36. After estimating the position of the target terminal 10 through processing similar to that executed in embodiment 1, the position estimation processing unit 34a transfers the estimated position information to the transmission data generation unit 35. Upon receiving the estimated position information, the transmission data generation unit 35 generates transmission data to be transmitted to the target terminal 10, which indicate the estimated position, and outputs the transmission data to the transmission circuit 36. The transmission circuit 36 converts the transmission data input thereto to a wireless signal and transmits the wireless signal to the target terminal 10 via the antenna 31.

Next, the operation executed in the position estimating system in embodiment 2 is explained.

A wireless position estimation request signal containing estimated position information from the target terminal 10 is received at the plurality of reference terminals 20 installed at positions at which the position estimation request signal can be received. At this time, at each reference terminal 20 having received the position estimation request signal, the reception circuit 22 measures the reception signal level value S1 and the reliability level S2 corresponding to the position estimation request signal, outputs the reception signal level value S1 and the reliability level S2 to the reception signal level utilization OK/NG judgment unit 24, converts the position estimation request signal to digital information and outputs the digital information to the reception data processing unit 23 as received data.

Next, if the received data processing unit 23 recognizes a position estimation request in the received data, the reception data processing unit 23 issues an instruction for the transmission data generation unit 25 to generate transmission data indicating the reception signal level value S1, and if previously estimated position information is detected, the reception data processing unit 23 transfers the information to the reception signal level utilization OK/NG judgment unit 24. The reception signal level utilization OK/NG judgment unit 24, having received at the estimated position information from the reception data processing unit 23, in turn, calculates the distance to the target terminal 10 based upon the estimated position information and the preset subject reference terminal position information and selects the threshold value corresponding to the calculated distance from the threshold value data. Then, it compares the reliability level S2 with the selected threshold value, and makes a utilization NG decision if the reliability level S2 is lower than the threshold value. If, on the other hand, the reliability level S2 is higher than the threshold value, it makes a utilization OK decision and outputs the OK decision and the reception signal level value S1 to the transmission data generation unit 25. In addition, if no estimated position information is received, it compares the reliability level S2 with a preset threshold value as in embodiment 1.

Subsequently, as the transmission data generation unit 25 receives the reception level utilization OK decision and the corresponding reception signal level value S1 from the reception signal level utilization OK/NG judgment unit 24 together with the transmission data generation instruction, it generates transmission data indicating the reception signal level value S1. The transmission circuit 26 then converts the transmission data to a wireless signal and transmits the wireless signal to the position estimating server 30 via the antenna 21.

The position estimating server 30, having received the wireless signal indicating the reception signal level value S1 with the high level of reliability transmitted from the reference terminal 20, determines the distance between the terminals by referencing the distance data based upon the reception signal level value S1 and also determines the installation position of the reference terminal 20 by referencing the position data based upon the ID code assigned to the reference terminal 20. The distance and the installation position are determined each time a wireless signal (reception signal level value S1) is received from a reference terminal 20. Based upon the distances between the target terminal and the reference terminals and the installation positions of the individual reference terminals 20 thus determined, the position of the target terminal 10 is estimated. Then, the position estimating server generates transmission data containing the estimated position information, converts the transmission data to a wireless signal and transmits the wireless signal to the target terminal 10 having transmitted the position estimation request signal via the antenna 31.

At the target terminal 10 from which the position estimation request signal originated, the wireless signal from the position estimating server 30 received via the reception circuit 14 is converted to digital information, the digital information is output to the received data processing unit 15 as received data, and if previously estimated position information is contained in the received data, the received processing unit 15 stores the previously estimated position information into the estimated position storage unit 16.

As explained above, in addition to the advantage of embodiment 1, i.e., a reduction in the volume of data to be communicated for purposes of position estimation to achieve a reduction in the length of processing time, embodiment 2 achieves a further advantage in that since the threshold value with regard to the reliability level S2, used in the judgment at each reference terminal 20 as to whether or not the reception signal level value S1 is to be utilized, can be adjusted flexibly, the accuracy of the position estimation is further improved.

It is to be noted that while the decision as to whether or not the reception signal level value S1 can be used for position estimation is made at each reference terminal 20 in embodiments 1 and 2 described above, the reception signal level value S1 and the reliability level S2 measured at the reference terminal 20 may both be transmitted to the position estimating server 30 to enable the position estimating server 30 to make a decision as to whether or not the reception signal level value S1 can be utilized for position estimation. In such a case, the position may be estimated by weighting the reception signal level value S1 in correspondence to the reliability level S2, instead of judging whether or not the reception signal level value S1 can be used in position estimation.

In addition, while an explanation is given above in reference to embodiments 1 and 2 on an example in which the present invention is adopted in conjunction with the position estimating method disclosed in reference literature 1, the present invention is not limited to this example and it may be adopted in any position estimating method as long as the position of the target terminal 10 is estimated based upon the reception signal level value S1.

What is claimed is:

1. A position estimating system comprising:
   a target terminal that wirelessly transmits a position estimation request;
   a plurality of reference terminals disposed at specific positions to measure reception signal levels of wirelessly transmitted signals from the target terminal; and
   a position estimating server that estimates the position of the target terminal based upon the reception signal levels measured in correspondence to at least some of the reference terminals,
   wherein the plurality of reference terminals each include a reception signal level utilization OK/NG judgment unit that makes a judgment as to whether or not the reception signal level that has been measured at the respective reference terminal is to be used in position estimation based upon an index indicating the level of reliability of the reception signal, and only transmits the measured reception signal level to the position estimating server if the reception signal level utilization OK/NG judgment unit determines that the level of reliability is high,
   wherein, at the reception signal level utilization OK/NG judgment unit, various threshold values are set in advance, each in correspondence to a specific distance to the target terminal, and
   wherein, when information indicating a previously estimated position of the target terminal is obtained, the reception signal level utilization OK/NG judgment unit calculates the distance to the target terminal, selects a threshold value based upon the distance thus calculated, compares the index with the selected threshold value, and determines that the reception signal level value that has been measured can be utilized for position estimation if the index is greater than the threshold value.

2. A position estimating system comprising:
   a target terminal that wirelessly transmits a position estimation request;
   a plurality of reference terminals disposed at specific positions to measure reception signal levels of wirelessly transmitted signals from the target terminal; and
   a position estimating server that determines distances between the target terminal and individual reference terminals based upon the reception signal levels measured at least some of the reference terminals and estimates the position of the target terminal based upon the distances thus determined,
   wherein the plurality of reference terminals each include a reception signal level utilization OK/NG judgment unit that makes a judgment as to whether or not the reception signal level value that has been measured at the respective reference terminal is to be used in position estimation based upon an index indicating the level of reliability of the reception signal, and only transmits the measured reception signal level to the position estimating server if the reception signal level utilization OK/NG judgment unit determines that the level of reliability is high,
   wherein, at the reception signal level utilization OK/NG judgment unit, various threshold values are set in advance, each in correspondence to a specific distance to the target terminal, and
   wherein, when information indicating a previously estimated position of the target terminal is obtained, the reception signal level utilization OK/NG judgment unit calculates the distance to the target terminal, selects a threshold value based upon the distance thus calculated, compares the index with the selected threshold value, and determines that the reception signal level value that has been measured can be utilized for position estimation if the index is greater than the threshold value.

3. A position estimating system according to claim 1, wherein:
   the index is a correlational value output by a correlation detector engaged in operation when demodulating data exchanged through spread spectrum communication.

4. A position estimating system according to claim 2, wherein:
   the index is a correlational value output by a correlation detector engaged in operation when demodulating data exchanged through spread spectrum communication.

* * * * *